United States Patent

[11] 3,580,667

| [72] | Inventor | Robert D. Moore<br>Houston, Tex. |
|---|---|---|
| [21] | Appl. No. | 766,093 |
| [22] | Filed | Oct. 9, 1968 |
| [45] | Patented | May 25, 1971 |
| [73] | Assignee | Kenneth F. Faukner<br>Kenmah, Tex.<br>a part interest |

[54] ENTERTAINMENT SYSTEM
8 Claims, 8 Drawing Figs.

[52] U.S. Cl. .................................................. 352/124,
352/123, 352/131, 352/156
[51] Int. Cl. ..................................................... G03b 21/02,
G03b 21/43, G03b 29/00
[50] Field of Search ........................................... 352/123,
124, 156, 131

[56] References Cited
UNITED STATES PATENTS

| 1,927,284 | 9/1933 | Howell .................. | 352/130X |
| 2,914,265 | 11/1959 | Vanderwal .............. | 352/124X |

FOREIGN PATENTS

| 1,124,346 | 2/1962 | Germany ................ | 352/124 |
| 316,257 | 6/1930 | Great Britain ............ | 352/124 |

*Primary Examiner*—Louis R. Prince
*Assistant Examiner*—Frederick Shoon
*Attorney*—Carl B. Fox, Jr.

ABSTRACT: Entertainment system including movie projection apparatus having enlarged film storage capacity, whereby multiple full length movies may be stored and shown in any sequence, and which is constructed as a unit for installation and use in passenger carriers such as aircraft, or in other places where space is limited.

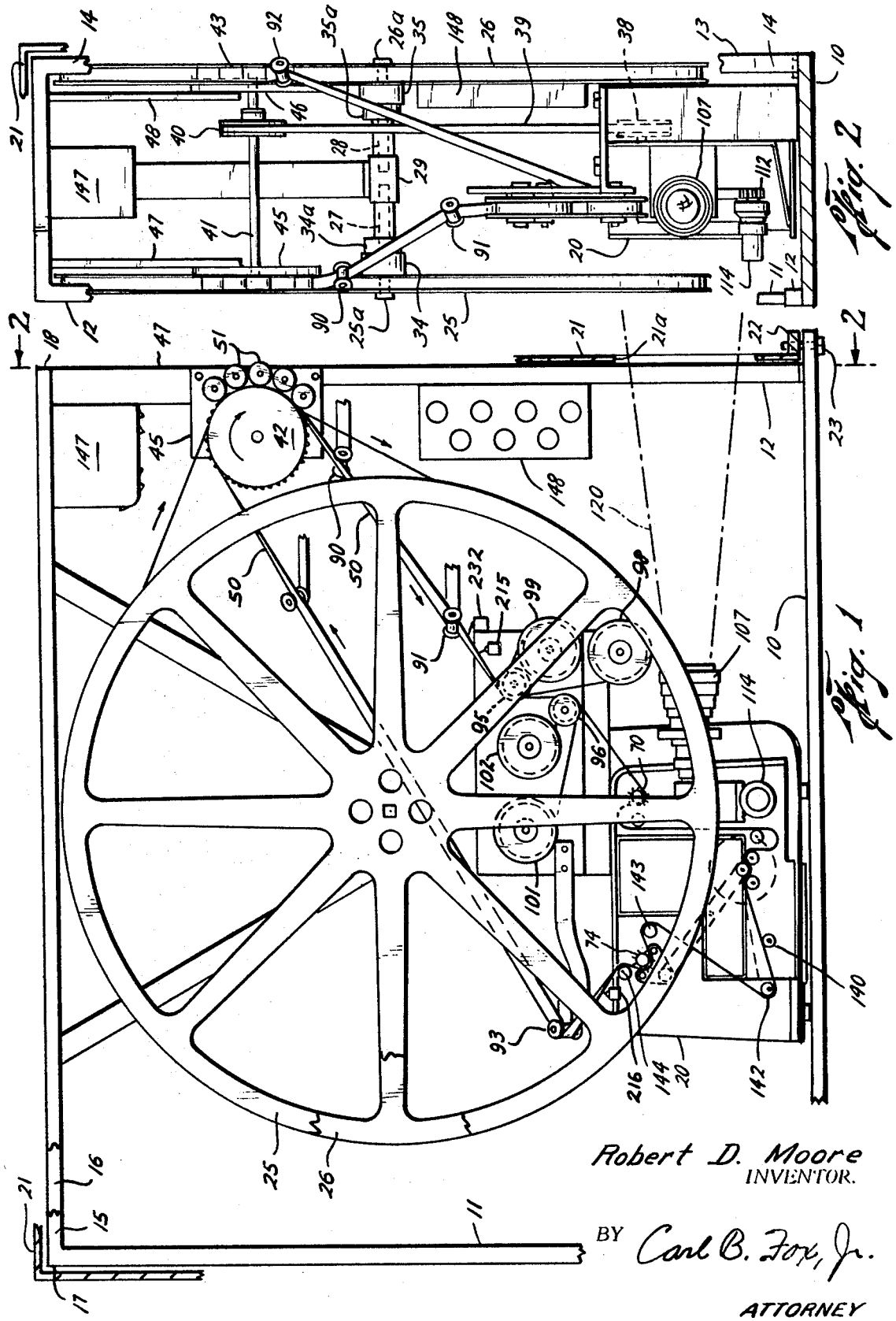

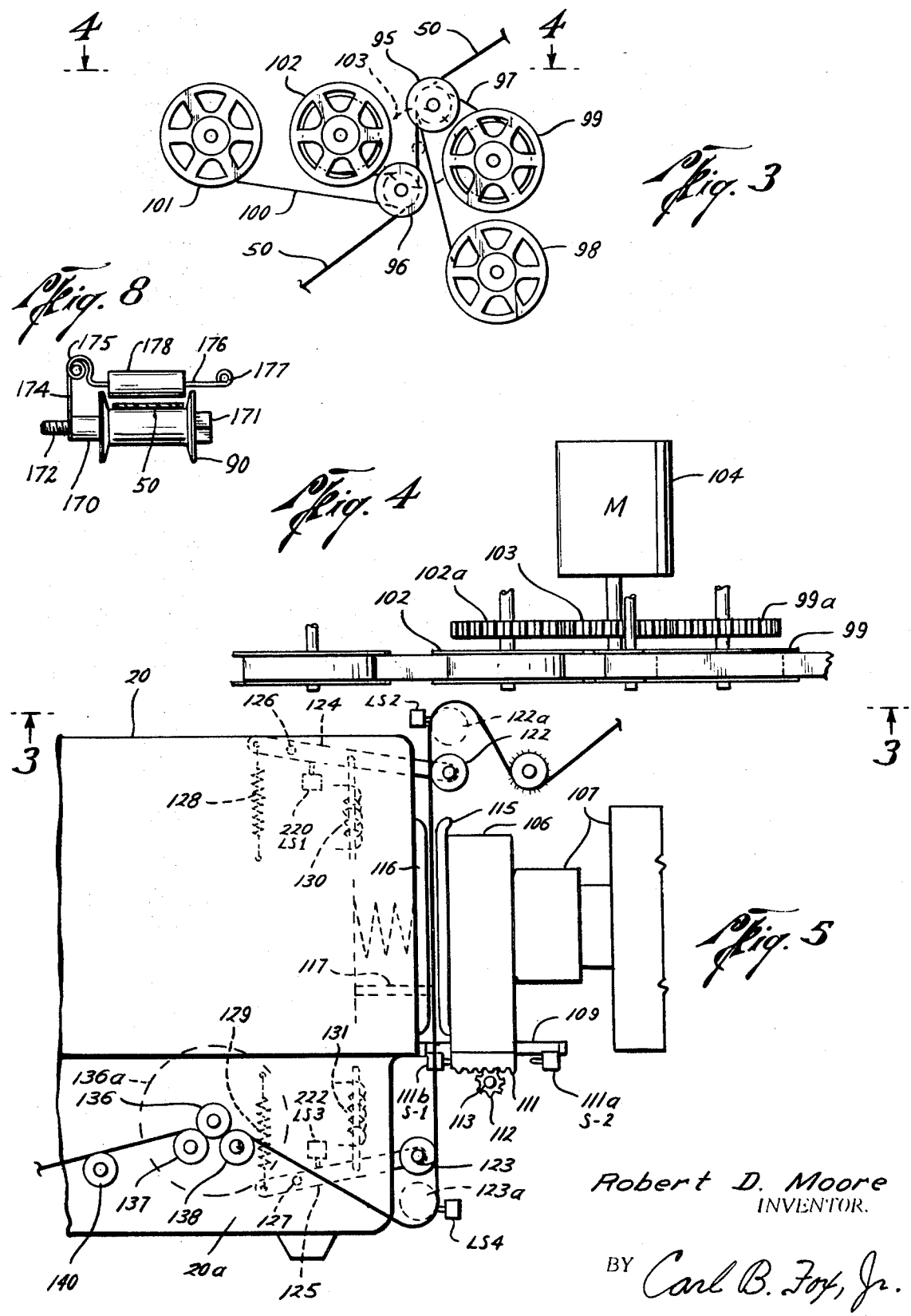

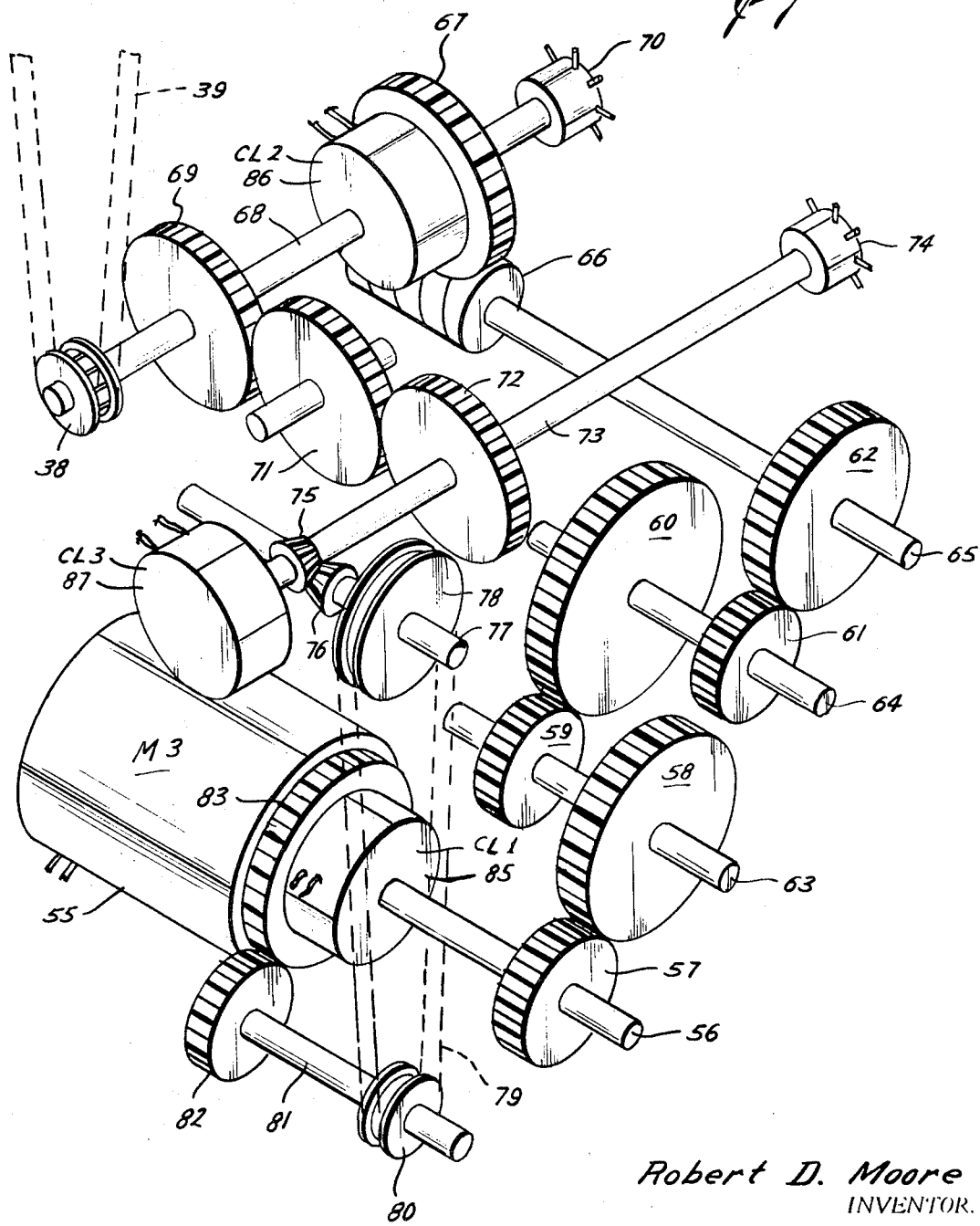

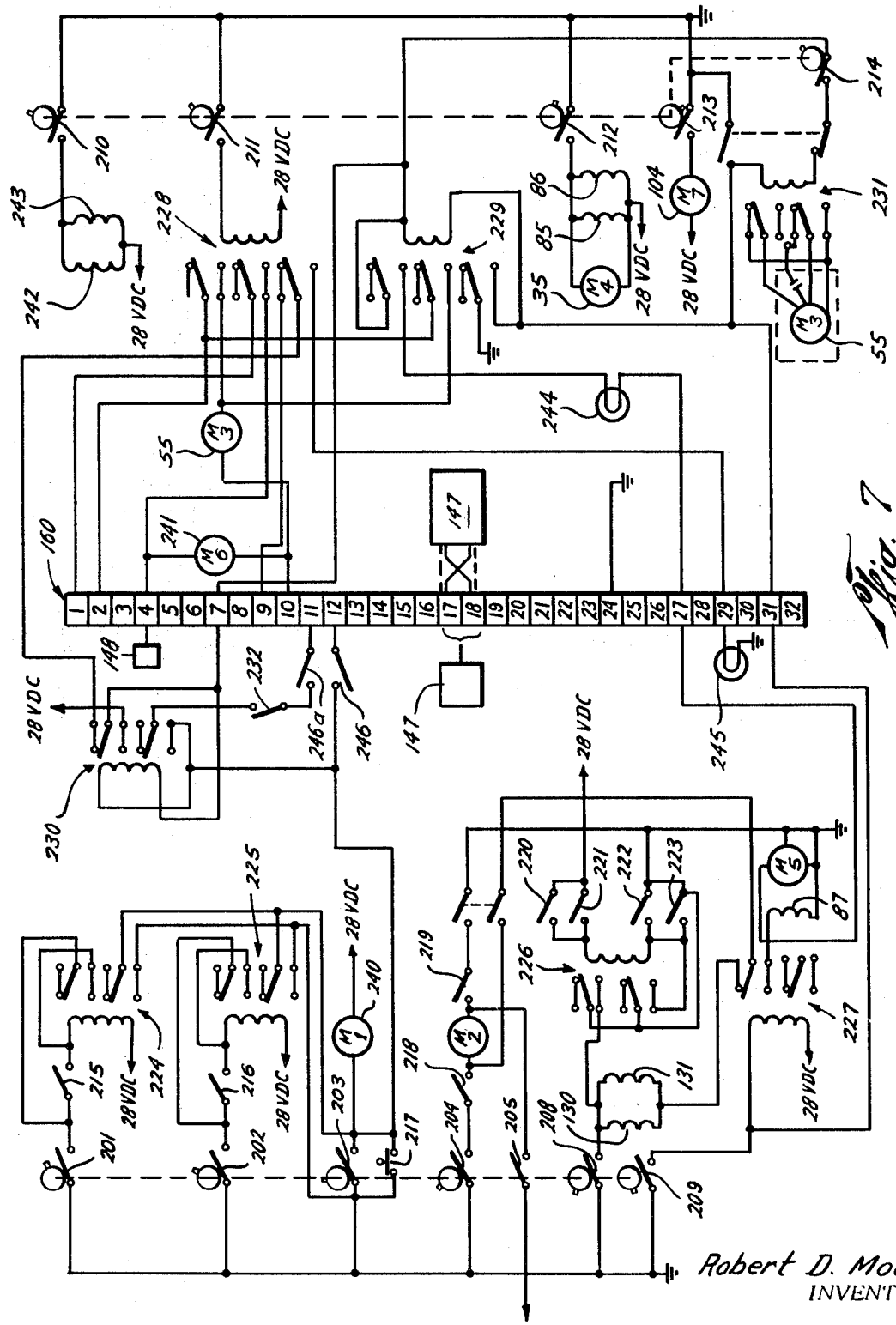

ENTERTAINMENT SYSTEM

BACKGROUND OF THE INVENTION

Field of the Invention

The field of the invention is the field pertaining to projection systems for the showing of motion pictures. The projection system is of a type wherein multiple complete motion picture films may be stored simultaneously, and adapted for showing in any sequence as desired.

The showing of motion pictures aboard aircraft and other transportation means presents considerable difficulties. The handling, rewinding, loading, and changing of film when the motion picture (s) to be shown is to be changed, is time consuming and difficult aboard aircraft and other vehicles, and in other locations of limited space. On flights wherein an aircraft moves back and forth between two places at a considerable distance apart, where the flight time would permit the showing of a complete motion picture in each direction of flight, it would be convenient if a different motion picture could be shown in each direction, since generally speaking a passenger flying in one direction will return in the opposite direction within a reasonable period of time, and will thereby see a different motion picture on his going and return flights. On extended journeys, time might permit the showing of more than one motion picture, but is difficult to do so because film storage capacity is low and because changing of the film is required if conventional equipment is employed, and the time and nuisance of so doing has almost universally prevented this being done. Also, where aircraft trips include a plurality of stops, it would be convenient if a separate motion picture of suitable length could be shown between stops in order that every passenger may be able to observe at least one complete motion picture. Previous equipment has not provided for these manners of showing motion pictures, apart from systems requiring the changing and replacement of films in order to achieve the changes in motion pictures desired.

SUMMARY OF THE INVENTION

In summary, the entertainment system hereby provided includes projector means wherein extremely large film holding reels are employed whereby a plurality of movie films of the same or different lengths may be simultaneously stored and carried, for use as desired. The projection system includes means for rapid forward and reverse movements of the film, and for normal film speed during projection. The film is disposed for movement to the beginning point of any movie stored on the reels, at any time, so that a selection of a movie to be shown may be quickly made, and the film moved at high speed to the beginning thereof, and then, when the film strip has been completely shown, the film is automatically quickly moved in the rewind direction to the commencing point of the film strip. The apparatus is especially adapted for installation into aircraft, having terminal connection means which is readily insertable into the usual connection outlet of aircraft. The projection system is compactly organized, whereby it requires only a relatively small space within an aircraft which may be readily provided during construction and fitting out of almost any commercial passenger type of aircraft.

BRIEF DESCRIPTION OF THE DRAWINGS

FIG. 1 is a side elevational view showing, partially in schematic form and partially cut away, a projection system for use as an entertainment system according to the invention.

FIG. 2 is a vertical cross-sectional view taken at line 2–2 of FIG. 1.

FIG. 3 is a partial enlarged side elevational view showing a film cleaner assembly which is included in the apparatus of FIGS. 1–2.

FIG. 4 is a further enlarged view showing the apparatus of FIG. 3, taken at line 4–4 of FIG. 3.

FIG. 5 is an enlarged partial side elevational view showing the front portion of the projector of FIGS. 1—2.

FIG. 6 is an enlarged partial perspective view showing the gear drive assembly of the projector of FIGS. 1–2 and 5.

FIG. 7 is a schematic circuit diagram showing the electrical circuit of the apparatus.

FIG. 8 is an enlarged view of a film strip retaining means.

DETAILED DESCRIPTION OF THE PREFERRED EMBODIMENT

Referring now to the drawings in detail, and first primarily to FIGS. 1 and 2, the apparatus includes a base plate or platform 10 of flat form perpendicularly upwardly from which depend four corner posts or columns 11—14 which are interconnected at their upper ends by rectangularly disposed frame elements 15—18.

A projector 20 is mounted upon the base plate. The projector is preferably mounted (by means not shown) such that the projector may be moved rearward and forward to a desired projection position, but is shown stationarily disposed in the drawings.

The frame supported on plate 10, made up of elements 11—14 and 15—18, is slideably received within a sheet metal or other suitable housing 21 which is fixed in place within the aircraft. The base 10 may be connected to the aircraft frame 22 by four screws 23 (one being shown) which are received through perforations in the corners of the base. Housing 21 is open at its bottom to receive the apparatus mounted on base 10.

A pair of large film holding reels 25 and 26, preferably each about 30 inches in diameter, are supported on cross shafts 27, 28 which in turn are journaled in bearings of hub 29 supported by angular arms 30, 31 fixed to cross members (not shown) extending between elements 15, 16. Drive motors 34 and 35 drive the respective reels in rotation in opposite directions. Motor 35 rotates reel 26 in the film "takeup" direction, at projection speed at fast "film forward " speed, and motor 34 rotates reel 25 at "fast rewind" speed. The reels are preferably of sufficient size to carry two or more full length feature motion pictures on one of the reels. Brakes 34a and 35a stop rotations of the respective reels whenever reel rotations are stopped.

Projector 20 has a driven sprocket 38 (see also FIG. 6) adapted to engage a timer belt 39. The timer belt is engaged at its other end around a sprocket 40 mounted on shaft 41 at opposite ends of which are disposed toothed film sprockets 42 and 43. Shaft 41 is supported by plates 45 and 46 which are carried by frame members 47 and 48, respectively, affixed to extend below frame element 18 as shown.

The film (or film strip) is indicated by reference numeral 50. Each driven sprocket 42, 43 is surrounded over a portion of its circumference by a plurality, five being shown, of adjacently disposed idler rollers 51. These rollers bear against the film strip and insure that the film strip perforations along the sides of the film strips will remain continuously in engagement with the sprocket teeth. The sprocket 38 of the projector is driven by the projector motor, as will be explained.

Within projector 20 (see FIG. 6), there is provided a drive motor 55, connected by actuation of clutch 85 with shaft 56 having a circular gear 57 engaged with a speed-reducing gear train consisting of gears 58—62 disposed mounted on rotative shafts 63—65, as shown. A bevel gear 66 carried on shaft 65 engages gear 67 connected to shaft 68 by actuation of clutch 86. Rotation of shaft 68 rotates gear 69, film feed sprocket 70, and timer belt sprocket 38, each fixed thereon. Gear 69 drives idler gear 71 and gear 72 fixed on shaft 73, on which is fixed film exit sprocket 74. Bevel gear 75 is connected to shaft 73 by actuation of clutch 87. Bevel gear 75, when connected to shaft 73, is engaged by bevel gear 76 on shaft 77 having sheave 78 thereon, with belt 79 therearound, the belt also engaging around sheave 80 on rotative shaft 81, this latter carrying gear 82 engaging gear 83 of motor 55.

The various shafts shown in FIG. 6 are supported for rotation by journal means within the projector, not shown, in conventional fashion.

During projection of the film strip to show a motion picture, sprockets 70 and 74 rotate to feed film to the projector and withdraw film therefrom. For this purpose, clutch 85, 86 are engaged to cause rotation of sprockets 70, 74 through the speed-reducing gear train, and clutch 87 is disengaged so that gear 75, although rotated by gears 83, 82, sheaves 80, 78 and belt 79, and gear 76, does not act to rotate shaft 73.

During fast rewind and during fast forward movements of the film strip, clutches 85, 86 are disengaged so that gears 57, 67, and the speed-reducing gear train therebetween, are disconnected from motor 55 and stopped. Clutch 87 is engaged, so that gear 75, driven through the connection with motor 55 including belt 79, rotates shaft 73 so that sprockets 38, 70, 74 are driven in appropriate rotation at high speed to move the film in either rewinding or forward direction through the projector, depending on the direction of rotation of motor 55.

Through sprocket 38 and timer belt 39, the sprockets 42, 43 are driven at slow film advancing speed in one direction (during film projection), are driven at fast film advancing speed in the same direction (during fast film advance), and are driven at fast film rewinding speed in the opposite direction (during film rewinding). Because of the bear and nonslip timer belt connections between sprockets 42, 43, 70, 74, the speeds are correlated so that film length between sprockets 42 and 43, through projector sprockets 70, 74, remains constant and there is no harmful tension placed on the film strip at any time, during projection, during fast film advance, or during fast rewind.

Motors 34, 35 which rotate reels 25, 26, respectively, are DC torque motors which maintain substantially constant tensions on the film strip. During projection, motor 35 is energized to wind film onto takeup reel 26, and motor 34 is deenergized so that film may be drawn from reel 25 by sprocket 42. During fast film advance, the operation is the same, but motor 35 rotates reel 26 at faster speed. During rewind, motor 34 is energized to rewind film onto reel 25, and motor 35 is deenergized so that film may be drawn from takeup reel 26.

In order that the film may be advanced at projection speed, and both advanced and rewound at high sped, projector motor 55 is reversible. By engagement of clutch 87, disengagement of clutches 85, 86, and reversal of the rotation of motor 55, the film strip may be advanced at high speed to move the film to the beginning of a motion picture beginning at an advanced point along the length of the film strip.

Angularly supported idler rollers 90, 91 guide and support the film 50 between feed reel 25 and sprocket 42. Rollers 92, 93 similarly guide the film 50 between takeup reel 26 and sprocket 43.

Interposed between roller 91 and the entrance of the film strip to the projector 50 at feed sprocket 70, there is a film cleaning assembly which is shown in FIGS. 1—4, and best shown in FIGS. 3—4. Film strip 50, in projection movement, passes from roller 91 over rollers 95, 96, being bent in one direction in passing over roller 95 and in the other direction in passing over roller 96. A film-wiping strip 97, of cloth or the like, is drawn from spool 98 over roller 95 and onto spool 99. A second film-wiping strip 100 is drawn from spool 101 over roller 96 and onto spool 102. Spools 99 and 102 have gears 99a and 102a, respectively, coupled therewith which are rotated by a gear 103 driven by a motor 104. When motor 104 is operated, which occurs briefly at each change in the type of apparatus operation, spools 99, 102 are rotated a short distance in the clockwise direction (as the spools are shown in FIGS. 1 and 3), and this brings fresh areas of wiping strips 97, 100 over the rollers 95, 96. Film strip 50 is thus wiped on both sides on each movement of the film, and is maintained in clean condition. Energization of motor 104 to change the wiping surfaces is controlled by the electrical circuit, to be described.

FIG. 8 shows a device for retaining the film strip in place on rollers supporting the film, for example on rollers 90—93, and on other rollers where the film must be held on the rollers. The device is shown in conjunction with roller 90, and is the same at each roller where it is provided.

Roller 90 is mounted on shaft 170, enlarged at 171 to retain the roller on the shaft. Reduced diameter threads 172 are provided for mounting the roller. A spring wire 174 is affixed about the base of threads 172 between the shoulder and support, and extends radially outwardly therefrom to a short coil formation 175, and then across the width of the roller at 176 to end loop 177. A roll 178 of Teflon, or other antifriction material is rotatively disposed on wire part 176, between the end flanges of roller 90, but not engaged therewith and spaced from the center shank portion of the roller. Loop 177 may be pulled outward from roller 90 for placement of film 50 on the roller, or for removal therefrom. Clearance is provided between roller 90 and roll 178 so that film 50 is free to pass therebetween, with each of the rollers 90 and 178 being rotated whenever contacted by the longitudinally moving film. The described film retainer devices present accidental removal of the film from the rollers due to vibrations, sways, and the like, of an aircraft or other vehicle.

The fast film speeds, forward and reverse or rewind, may be anywhere up to about 25 times the projection film speed, preferably from 5 to 25 times the projection film speed. Gear train 57—62 is altered to obtain the desired speed ratio, with alteration of motor 55 speed.

At the front side 105 of projector 20 (see FIG. 5), there is movably supported a gate housing and lens support 106 carrying a projection lens assembly 107. FIG. 5 is schematic in its showing. The gate housing and lens support 106 is slidably movable forward (to the right) and rearward (to the left) upon a track element 109 depending from the front of the projector. Member 106 supports therebelow a toothed rack 111 engaging gear 112 carried on the shaft 113 of reversible motor 114 (see FIG. 1). When motor 114 is operated, the rack is moved forward or rearward, depending on the direction of rotation of the motor, moving the housing and film gate 115 carried thereby forward or rearward. Limit switches 218, 219 carried on track 109 shut off motor 114 when the gate is fully closed (moved rearward, to the left) or fully opened (moved forward, to the right). Forward movement of the film gate 115 causes forward spring-biased movement of the film guide 116 to clear the film of the conventional film-advancing claws 117 (one shown) for fast film movements in either direction. Rearward movement of gate 115 pushes the gate against the film to depress guide 116 and move the film to be engaged by claws 117 for downward frame-by-frame advancement of the film for projection in the usual manner.

Housing 21 has an aperture 21a therethrough for passage of the projected beam of light 120 during projection.

A pair of loop-restoring rollers 122, 123 are pivotally mounted at the front of the projector above and below the film gate. Rollers 122, 123 are respectively carried on pivotal arms 124, 125 mounted on pins 126, 127, and biased to their normal pivotal positions (solid lines) by springs 128, 129. Arm 124 is movable to elevate roller 122 to dashed-line position 122a by a solenoid 130, and roller 123 is similarly movable downwardly to position 123a by solenoid 131. Actuation of either or both of limit switches 220, 222 causes energization of the solenoids 130, 131 when film tension pulls the roller 122 down and/or roller 123 up, beyond their normal positions, indicating lack of one or both of the upper and lower film loops. Therefore, the proper upper and lower film loops are restored each time the film tightens at the projector gate, at any time.

After the film loops have been restored, by simultaneous upward movement of roller 122 to position 122a and downward movement of roller 123 to position 123a, respective limit switches 221, 223 are engaged to deenergize the solenoids 130, 131, so that the rollers are returned to their normal positions 122, 123 (solid lines) by spring means 128, 129.

At the recessed lower side of the projector 20a, three rollers 136, 137, 138 are mounted, the film being passed below roller 136, and above rollers 137, 138 which resiliently bear upwardly against the film and roller 136, and are depressable for film insertion. Roller 136 has a weighted wheel 136a mounted for rotation therewith. This assembly serves to dampen film vibrations before the film reaches the sound drum 140. This portion of the apparatus is conventional and is therefore incompletely described and shown, as it is well known in the art.

Rearwardly, on leaving the projector (during projection) or entering the projector (during rewind), the film passes over idler rollers 142, 143 and film drive sprocket 74 (see FIG. 1). The film is positively engaged with both drive sprockets 70, 74 as schematically indicated only at sprocket 74. An idler roller 144 is provided at the other side of sprocket 74.

In FIG. 1, locations for the audio amplifier 147 and the projector lamp power supply 148 are indicated, these being suitably supported by the frame and placeable at any other suitable locations therewithin, as desired.

Reels 25, 26 may be removed and replaced by withdrawing the base 10 and frame assembly downwardly from the housing 21 and unscrewing nuts 25a, 26a. Smaller reels may be used, but where it is desired that multiple films be available for showing, the large (usually 30 inch diameter) reels are preferred. Normally, film will be changed by removal and replacement of reel 25.

Referring now to FIG. 7 of the drawings, showing an electrical circuit useful in operating the apparatus herein disclosed, AMPHENOL connector pole 160 is a multiple connection element of conventional form suitable for connection into the electrical power supply of conventional aircraft, and known to those skilled in the art. All relay switches shown in FIG. 7 are shown in the relaxed, deenergized, positions.

When the projector is stopped (no film movement), being either completely shut down or stopped before or after the showing of a motion picture or after fast rewind of the film strip, the switches shown in the drawing are in the following positions: Switches 201, 204, 205, 210, and 218 are closed, and switches 202, 203, 206, 207, 208, 209, 211, 212, 213, 214, 219, 224, 225, 227, 228, 229, and 231 are open.

During projection operation of projector 20, to show a motion picture (film movement forward at slow projector speed), switches 201, 206, 207, 208, 211, 212, 219, 224, and 228 are closed, while switches 202, 203, 204, 205, 209, 210, 213, 214, 218, 225, 227, 229, and 231 are open.

When the apparatus is in operation for fast film advance (fast forward movement of the film), for example when it is desired to move quickly from the beginning of the first motion picture on reel 25 to the beginning of a second motion picture on the reel, switches 201, 206, 207, 211, 212, 214, 219, 224, 228, 229, and 231 are closed, and switches 202, 203, 204, 205, 208, 209, 210, 213, 218, 225, and 227 are open.

During fast rewind movement of the film, switches 202, 204, 205, 209, 211, 218, 225, 227, 228, 229 are closed, while switches 201, 203, 206, 207, 208, 210, 212, 213, 214, 219, 224, and 231 are open.

The switches 201—214, inclusive, are cam operated control switches, which are moved to the various described operating positions by operation of cam motor 240. Motor 240 is connected to a shaft having mounted thereon a series of cams, the cams being designed and positioned for operation of switches 201—214 to the described coordinated operating positions. Switch 246 (a pushbutton) is closed to start motor 240 to move the cams to the next operative positions. Switch 246, and the other switches used in operation of the apparatus, will usually be installed in aircraft circuits leading to pins of connector 160.

Motors 114, 34, 35, 55 and 104 have already been mentioned, and the switch positions necessary to their operation are clearly found in the circuit diagram. Motor 241 operates a fan (not shown) within the projector which serves to cool the projector lamp, as is conventional.

Switch 210 is closed by its cam driven by motor 240 to actuate solenoids 242, 243 of reel brakes 34a, 35a to set at all times that film movement is stopped to inhibit changes in film tension, as, between different operating stages, e.g. between projection and fast rewind, between rewind and fast forward, etc. Switch 213 is closed by its cam, but only briefly, at the same times, to advance film cleaning strips 97, 100, to present fresh surfaces for cleaning the film. The strips 97, 100 are preferably advanced only a short distance, say, from one-half inch to one inch.

Switch 215 is a notch switch, actuated by notches on the film, as are well known in the art. It is operated to close by a film notch at the end of each motion picture on the film, the film being prepared with the notches for this purpose before being loaded into the projector apparatus. Switch 216 is another notch switch which is operated by a film notch after fast rewinding of the film, the film notch being at the beginning of the first motion picture on the film strip.

Switch 217 is a manually operated switch included to perform the function of switch 203, and is provided for shop testing only.

As has been described, limit switches 220, 222 are simultaneously closed when undue film tension occurs at one or both of rollers 122, 123 at the gate of the projector. This causes energization of the solenoid to close relay switches 226 to actuate loop-restorer solenoids 130, 131 to move the loop restorer rollers 122, 123 to their respective upwardly and downwardly moved positions. On arriving at these positions, limit switches 221, 223 are opened, opening switches 220, 222, whereby the loop restorer solenoids are deenergized.

Element 160 is an Amphenol (No. MS-24263R22B32P) connector adapted to fit into the electrical power outlet of an aircraft. The details of this element are not shown in the drawing, but this form of connector is commonly employed on commercial aircraft. 32 pins or terminals of the connector are shown, numbered consecutively. Connector 160 has supplied thereto, from the aircraft circuits, at pin 1, 400 cycle, 3 amperes, alternating current. At pin 2, 400 cycle, 10 amperes, alternating current is supplied, and at pin 7, 28 volt DC power is supplied.

Pin 7 is connected to a relay switch 230 which is energized at all times that the 28 volt DC power supply is "on." A safety switch 232, shown also in FIG. 1 adjacent roller 91, is adapted to sense film tension, the switch being closed so long as film is present at the location of the switch, but the switch opening when film for some reason is not present at that location, such as, for example, when the film breaks and film feed to the projector ceases. Opening of switch 232, of course, shuts off all 28 volt DC power supply to the apparatus so that operation of the apparatus is stopped.

Pin 4 of connector 160 connects the pin 1 alternating power supply to the projector lamp supply 148, indicated also on FIG. 1. Pin 9 of connector 160 supplies power to another aircraft system when the projector system is "off," the function of which is not connected with the invention. Pin 10 of connector 160 is connected to common alternating circuitry of the aircraft, which functions to complete the circuit through projector motor 55. Pins 11 and 12 of connectors 160 are usually connected to pushbutton control switches mounted in the aircraft, and not shown in the drawings, herein represented by the switches 246, 246a, which are shown out of position but functionally the same. When the pushbutton of switch 246a is pushed, switch 246a is opened and the projector system is turned "off," since the DC circuit is opened. When the pushbutton of switch 246 is pushed in, the switch 246 is closed and the circuit of motor 240 is momentarily energized to turn on the projection apparatus.

Pins 17 and 18 of connector 160 are connected to external speaker circuits of the aircraft, through which sound signalled by the projector film through sound drum 140 is caused to function. Pin 24 is grounded to the frame of the aircraft. Pin 29 is likewise grounded to the aircraft.

The switches referred to by reference numerals 224—231 are solenoid operated relay switches, as shown in the drawing. The reference numerals are intended to indicate the entire relay (solenoid plus switches) in each case. Lamps 244, 245 are indicator lamps for indicating flow of current through the respective circuits.

Relay switch 231, of course, acts to reverse the projector motor 55 for fast rewind of the film from reel 26 onto reel 25 as has been heretofore described. Motor 114 is also a reversible motor, and operates in one direction or the other depending on the positions of switches 218, 219.

The entire systems is controlled, for example, by a stewardess aboard an aircraft, by four operating switches. There is an "on"-"off" power switch which turns "on" and "off" the aircraft power supplies to connector 160. This switch is a part of the aircraft electrical system and is not shown in FIG. 7. The control panel for the projection apparatus includes three switches, the pushbutton of switch 246 to start projection at the beginning of any film, the pushbutton of switch 246a to stop projection, and fast forward film movement switch 231. To start the system in operation, the power switch is turned on. Then the pushbutton (switch 246) to start the projector is operated, which starts motor 240 whereby the cams rotate to properly set the cam operated switches 201—214 to projection positions. When the first motion picture is completed, the notch on the film at the end of the first motion picture operates switch 215 to close, which closes switches 224 to actuate motor 240 to move the cams to the next operating positions as indicated for the "stop" positions. Pushing of switch 246 to again close starts the second motion picture projection. When the second motion picture has been fully shown, the switch 215 again closes momentarily to again shut off the system, but the cams move on its second operation to start the system in fast film rewinding operation, this proceeding until all of the film length has been rewound on reel 25, at which location of the film notch switch 216 turns off the equipment. For fast forward film movement, the stewardess of other operator pushes the fast forward film movement switch 231, and the film is moved forward fast to the end of the first motion picture, at which point switch 215 stops the film movement. The second motion picture may then be shown. If it is desired to rewind the film without showing the second motion picture, then the fast forward operation may be used to move to the end of the film strip, at which time switch 215 is actuated to rewind the entire length of the film strip onto reel 25.

The operation of the equipment is thus made entirely automatic and simple. The system is useful in connection with long flights of aircraft in both directions, for example, the film being changed every few weeks or so, and one motion picture being shown in one direction of aircraft travel, and the second motion picture being shown on the return trip. Thus, a passenger going on the aircraft from home, in one direction, and then returning sometime later, will see two different movies on each of his trips, and will not be subjected to repetition of the motion picture which he had theretofore seen.

The arrangement of the elements making up the apparatus may be varied, so long as the elements are interrelated to perform their required functions. For example, the reels 25, 26 may be positioned horizontally or angularly instead of vertically; the reels need not necessarily be placed side by side; the projection direction could be crossways of the reels; the various switches could be relocated; the base plate and frame may take other form; etc.

In embodiments wherein the base plate 10 and frame, carrying the projection apparatus, are disposed within a housing installed in an aircraft, or the like, the base and frame may be movably supported, as by cables, by extensible constant-torque springs, by rack and gear motor driven support, or other device for movements out of an into the housing, in order to render film-changing, maintenance, and the like, more convenient.

While a preferred embodiment of the invention has been shown and described, many modifications thereof may be made by a person skilled in the art without departing from the spirit of the invention, and it is intended to protect by Letters Patent all forms of the invention falling within the scope of the following claims:

I claim:

1. Projection system, comprising a motion picture projector having a film gate through which film is moved frame by frame by advancing claws for projection, means for moving said film gate clear of the advancing claws for fast film movements in both forward and rewind film movement directions, first reel means for storing film wound thereon for projection and for receiving film during rewind, second reel means for receiving film during projection and from which film is delivered during rewind, driven sprocket means disposed between each said reel means and said film gate for feeding film to said film gate and for withdrawing film from said film gate during film movements in both forward and rewind film movement directions, projector drive motor means for driving said driven sprocket means to move the film at slow forward projection speed through said film gate with said claws advancing said film frame by frame therethrough for projection and for moving the film at fast forward and rewind speeds to advance and rewind the film rapidly clear of said advancing claws, said sprocket means being driven at corresponding speeds and maintaining constant film length therebetween through said film gate whereby the film is not excessively tensioned during said movements thereof, said sprocket means comprising, at each side of said film gate, a driven projector film sprocket spaced from said film gate to enable formation of a film loop between the projector film sprocket and the film gate and a secondary driven film sprocket spaced from the projector film sprocket adjacent one of said reel means, said advancing claws and all of said sprocket means being driven by a projector motor means whereby their film moving speeds correspond and film tension remains constant therethrough; and including separate reel motor means for each said reel means for drawing film arriving at the respective reel onto the reel at predetermined torque and film tension; and including brake means for stopping rotations of said reels when said projector motor is stopped; whereby film tensions are maintained uniform throughout the system and likelihood of film damage and breakage is minimized even during said fast film forward and fast film rewind film movements.

2. The combination of claim 1, said fast film speeds being in the range of about 5 to 25 times the projection film speed.

3. The combination of claim 1, said means for moving the film gate clear of the advancing claws of the projector, said film gate having an element at each side of the film disposed therethrough, comprising slidable mounting means for one gate element enabling movement thereof away from the other gate element, rack means carried by said one gate element, electric motor driven gear means engaging said rack means operable to move said rack means and one gate element against and away from said other gate element, the advancing claws extending through said other gate element to engage the film when said one gate element is moved thereagainst, said other gate element being spring-biased to move clear of said film advancing claws when said one gate element is moved away therefrom, and means for actuating said motor to move said one gate element against said other gate element during projection of the film and away from said other gate element during said fast forward and rewind film movements.

4. The combination of claim 3, including, at each end of said film gate between said film gate and said driven projector film sprocket, a movable film loop restorer roller means spring biased to inoperative position and solenoid-actuated to temporarily move away from said film gate to restore the film loop at that end of the film gate, said loop restorer rollers being simultaneously actuated to move away from the film gate as described by film tension thereover and said actuation being terminated upon full moving away of said rollers so that thereafter said rollers resume said inoperative positions thereof.

5. The combination of claim 4, including film cleaning means comprising a pair of spaced rollers disposed oppositely out of line of the path of said film between one said projector sprocket and secondary sprocket and having said film disposed outwardly around each roller of said pair with one roller at one side of the film and the other roller at the other side of the film, a pair of spools associated with each roller of said pair for passage therebetween of a cleaning strip passed over the roller beneath the film thereon, and means for rotating said spools to change the cleaning strip areas contacted by the film each time operation of said projector is altered, whereby the film is wiped at each side over said strips on said rollers during each film movement in either direction.

6. The combination of claim 5, including base means supporting said projector, frame means carried upon said base supporting said secondary sprocket means, said reel means, and said film cleaning means, guide roller means for guiding film movements between each of said projector and secondary sprockets, releasable means for maintaining the film in place on each said guide roller means, housing means having an open side to removably receive said frame means into said housing means with said base engaged around the open side of said housing means, and an aperture through said housing permitting light projection therethrough by said projector.

7. The combination of claim 6, each said means for maintaining the film in place on a guide roller means comprising a spring wire anchored at one end at the end of the roller axis and extending therefrom transverse to said axis and having a helically formed portion outwardly of said axis, the other end of said wire extending from said helically formed portion across the width of the roller to terminate in a loop formation and having therearound a roll formed of antifriction material disposed between the roller flanges to hold film on the roller but spaced from the roller surface and film, said roll being resiliently movable away from the roller by an outward pull on said loop whereby film may be installed on and removed from said roller.

8. The combination of claim 6, said system including control means comprising electric motor driven camoperated switch means for actuating said apparatus in said slow forward projection operation, in fast film advance operation, and in fast film rewind operation; switch means for moving said cam-operated switch means to positions for said projection operation and said fast film advance operation; notch actuated switch means for shutting off said apparatus at the end of each motion picture of which the film is made up, and for automatically moving said cam-operated switch means to position for fast film rewind operation at the end of the last motion picture of the film.